United States Patent [19]

Kausga et al.

[11] Patent Number: 4,555,357

[45] Date of Patent: Nov. 26, 1985

[54] POLYACETAL RESIN COMPOSITION

[75] Inventors: Takuzo Kausga; Yukio Ikenaga; Kunio Suzuki, all of Fuji, Japan

[73] Assignee: Polyplastics Company, Ltd., Osaka, Japan

[21] Appl. No.: 531,551

[22] Filed: Sep. 12, 1983

[30] Foreign Application Priority Data

Sep. 16, 1982 [JP] Japan .................................. 57-161500

[51] Int. Cl.$^4$ ............................................. H01B 1/06
[52] U.S. Cl. ...................................... 252/511; 252/510
[58] Field of Search ........................ 252/511, 510, 502; 524/495, 496, 221, 227, 228

[56] References Cited

U.S. PATENT DOCUMENTS 4,374,048  2/1983  Kim et al. ............................ 252/511
4,391,741  7/1983  Masamoto et al. .................. 252/511

Primary Examiner—Josephine L. Barr
Attorney, Agent, or Firm—Robert M. Shaw

[57] ABSTRACT

Polyacetal resin composition containing electrically conductive carbon black is improved in respect to stability to heat by incorporating thereinto an amide compound.

12 Claims, No Drawings

POLYACETAL RESIN COMPOSITION

The present invention relates to a thermally stable, electrically conductive, polyacetal resin composition.

Heretofore, compounding polyacetal resin with a sufficient amount of electrically conductive carbon black has been practiced as a method for imparting electrical conductivity to the resin.

However, compounding polyacetal resin with a sufficient amount of electrically conductive carbon black to satisfactorily achieve desired performances will markedly reduce the thermal stability of polyacetal resin, resulting in notable interference with its moldability and also deterioration of its properties.

The present invention relates to an electrically conductive polyacetal resin composition in which these drawbacks have been overcome through appreciable improvement in the thermal stability by adding an amide compound to the polyacetal resin composition compounded with electrically conductive carbon black.

The electrically conductive carbon black used in this invention may include commercially available electrically conductive carbon black, e.g., Ketjen Black EC (a product of Lion-Akzo Co., Ltd.).

Preferable electrically conductive carbon black should have a generally well developed structure, small particle size, high micro-porosity and large surface area.

The amount of the electrically conductive carbon black added shall be 3–30 weight % of the whole composition. With less than 3 weight %, the desired electric conductivity cannot be achieved and with more than 30 weight %, its compounding with polyacetal resin will become difficult. Accordingly, the preferable amount of addition, from the viewpoint of properties and formulation, should be 3–10 weight %.

The amide compound used in this invention includes those of mono- or poly-carboxylic acids represented by the following general formula and ethylene oxide adducts thereof:

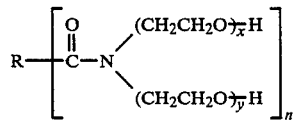

In this formula, R represents a carboxylic acid residue, which is a saturated or unsaturated hydrocarbon group having at least two carbon atoms, preferably one having 2–23 carbon atoms. Or R may be a group representing a basic unit of a vinyl polymer or a vinyl copolymer. n is an integer of 1 or larger, preferably 1–6. x and y are each 0 or an integer of 1 or larger, preferably 1–10.

Accordingly, the amide compounds used in this invention include those of fatty acids, higher fatty acids, etc., or ethylene oxide adducts thereof and those of polymers of vinyl compounds or of copolymers mainly comprising vinyl compounds or ethylene oxide adducts thereof. Cited as such amide compounds employed in this invention are, for example, butyamide, caproamide, caprylamide, capramide, lauramide, myristamide, palmitamide, linolenamide, erucamide, natural higher fatty acid amides as a mixture of higher fatty acid amides, succinamide, adipamide, sebacamide, dodecanedicarboxylic acid diamide, 1,6-cyclohexanedicarboxylic acid diamide, propane-1,2,3-tricarboxylic acid triamide, benzamide, phthalamide, terephthalamide, trimellitamide, pyromellitamide, polyacrylamide, polymethacrylamide, and ethylene-acrylamide copolymer, and ethylene oxide adduct thereof. These amide compounds may be used alone or as a mixture of two or more of them. Preferable amide compounds are ethylene oxide adducts of higher fatty acid amides, especially those with the number of moles of ethylene oxide added being x+y=2−7 giving a prominent effect.

The amount of these polyamide compounds added is 0.1–15 weight % of the whole polyacetal resin composition, more preferably 0.3–5 weight %.

The polyacetal resin used in this invention refers to polyoxymethylene homopolymer or polyacetal copolymers with a major portion of its main chain composed of consecutive oxymethylene units. The polyacetal resin composition of this invention may be compounded with an additive such as well-known antioxidant or antiacid agent.

Cited as such antioxidants are, for example, phenols such as 2,2′-methylenebis-(4-methyl-6-t-butylphenol), hexamethylene glycol bis(3,5-di-t-butyl-4-hydroxyhydrocinnamate), tetrak methylene[(3,5-di-t-butyl-4-hydroxyhydrocinnamate)]-methane, 1,3,5-trimethyl-2,4,5-tris(3,5-di-t-butyl-4-hydroxybenzyl)-benzene, 4,4′-methylenebis(2,6-di-t-butylphenol) and 1,3,5-tris(4-t-butyl-3-hydroxy-2,6-dimenthylbenzyl)isocyanurate, and amines such as N-phenyl-N′-isopropyl-p-phenylenediamine, N,N′-diphenyl-p-phenylenediamine, 4,4′-bis(4-α,α-dimethylbenzyl)diphenylamine, a condensate between diphenylamine and acetone, N-phenyl-β-naphthylamine and N,N′-di-β-naphthyl-p-phenylenediamine.

Cited as antiacid agents are, for example, urea, dicyandiamide, melamine, polyamide and metal salts of lower and higher fatty acids, e.g., calcium stearate.

These antioxidants and anti-acid agents may be used each alone or as a mixture of two or more of them. When stearamide or lauric acid diethanolamide is used as the amide compound of this invention, the resin composition of this invention which further contains antioxidant amine(s) such as alkyl-substituted diphenylamine shows an especially excellent thermal stability.

In exercising this invention, joint use of an additive for improving the dispersion of carbon black, for example, an oligomer, besides the above-mentioned additives, is recommended.

The oligomer is a low molecular weight polymer which per se gives only low moldability. For ease in the addition operation, it should preferably be in a solid state at normal temperature.

As examples, paraffin wax, microcrystalline wax, polyethylene wax, polypropylene wax and other polyolefin waxes may be cited.

Polyethylene wax may be manufactured by thermal decomposition of high molecular weight polyethylene resin produced by a high-pressure process or by direct polymerization of ethylene monomer. Generally, polyethylene waxes whose molecular weights are reduced by thermal decomposition at such a high temperature as above 300° C. contain some branched and polar groups and, therefore, are particularly preferable in dispersibility, etc., to polyethylene waxes mainly composed of hydrocarbons obtained by direct polymerization. Cited as an example of conventional dispersants for carbon black is oil. These dispersants may be used as a mixture of two or more of them. With these dispersants which enable better dispersion of carbon black and reduction in the amount of amide compounds added, polyacetal resins having uniform mechanical properties are obtained. ends of the test piece after being coated with an electrically conductive paint and dried.

TABLE 1

| Composition and property | Unit | Example 1 | 2 | 3 | 4 | 5 | 6 | 7 | 8 | 9 | 10 | 11 | 12 | 13 |
|---|---|---|---|---|---|---|---|---|---|---|---|---|---|---|
| Polyacetal resin*[1] | wt % | 95.5 | 94.0 | 90.0 | 90.0 | 88.0 | 85.0 | 90.0 | 89.5 | 90.0 | 91.0 | 89.0 | 89.0 | 90.0 |
| Electrically conductive carbon black*[2] | wt % | 3 | 4.0 | 8.0 | 8.0 | 8.0 | 10.0 | 8.0 | 8.0 | 8.0 | 8.0 | 8.0 | 8.0 | 8.0 |
| Stearic amide | wt % | | | 2.0 | | | | | | | | | 2.0 | |
| Lauric acid diethanolamide | wt % | 1.5 | 2.0 | | 2.0 | 4.0 | 5.0 | 1.0 | 1.0 | 5.0 | 1.0 | 2 | | 1.0 |
| Polyethylene wax | wt % | | | | | | | 1.0*[3] | 1.5*[3] | 1.5*[3] | | 1.0*[3] | 1.0*[3] | 1.0*[4] |
| Thermal stability | %/min | 0.024 | 0.029 | 0.052 | 0.039 | 0.034 | 0.05 | 0.045 | 0.039 | 0.057 | 0.053 | 0.036 | 0.040 | 0.050 |
| Volume resistivity | Ω·cm | $5.1 \times 10^{13}$ | $3.2 \times 10^{13}$ | 20 | 24 | 20 | 5.4 | 18 | 16 | 17 | 22 | 21 | 21 | 20 |
| Tensile strength | kg/cm² | 591 | 575 | 578 | 570 | 502 | 486 | 594 | 587 | 606 | 603 | 575 | 579 | 570 |
| Extrudability | Visual check | Acceptable | Acceptable | Acceptable | Acceptable | Acceptable | Acceptable | Acceptable | Acceptable | Acceptable | Acceptable | Acceptable | Acceptable | Acceptable |

*[1]Duracon M90 manufactured by Polyplastics K.K.
*[2]Ketjen black EC manufactured by Lion-Akzo Co., Ltd.
*[3]Low molecular weight polyethylene wax (molecular weight 5,000, a product manufactured by thermal decomposition)
*[4]Low molecular weight polyethylene wax (molecular weight 4,000, a product manufactured by direct polymerisation)

TABLE 2

| Composition and property | Unit | Comparative Example 1 | 2 | 3 | 4 |
|---|---|---|---|---|---|
| Polyacetal resin[1] | wt % | 95.0 | 92.0 | 91.0 | 90.0 |
| Electrically conductive carbon black[2] | wt % | 5.0 | 8.0 | 8.0 | 10.0 |
| Stearic amide | wt % | | | | |
| Lauric acid diethanolamide | wt % | | | | |
| Polyethylene wax | wt % | | | 1.0[3] | |
| Thermal stability | %/min | 0.08 | 0.12 | 0.098 | — |
| Volume resistivity | Ω·cm | $4.2 \times 10^{12}$ | 25 | 23 | — |
| Tensile strength | kg/cm² | 643 | 636 | 621 | — |
| Extrudability | Visual check | Acceptable | Acceptable | Acceptable | Wrong |

[1]Duracon M90 manufactured by Polyplastics K.K.
[2]Kejan Black EC manufactured by Lion-Akzo Co., Ltd.
[3]Low molecular weight polyethylene wax (molecular weight 5,000, a product manufactured by thermal decomposition)

able. The joint use of the amide compounds and polyethylene wax further improves the thermal stability. The amount of addition of such polyolefin wax as the aforementioned polyethylene wax is 0.3-3 weight % of the resin composition, preferably 0.5-2 weight %.

This invention will now be described in more detail by way of Examples and Comparative Examples thereof, but it shall not be restricted to such embodiments only.

EXAMPLES 1-3 AND COMPARATIVE EXAMPLES 1-4

To powdered polyacetal resin (trade name Duracon M90, manufactured by Polyplastics K.K.), electrically conductive carbon black (trade name Ketjen Black EC, manufactured by Lion-Akzo Co., Ltd.) and the additives shown in Tables 1 and 2 were added in the amounts shown in Tables 1 and 2. The mixture was melted and kneaded in a ZSK extruder after mixing in a Henschel mixer, thereby preparing pellets. Table 1 refers to Examples, while Table 2 refers to Comparative Examples.

The thermal stability of the pellets and the electrical conductivity and mechanical properties of molded products of these pellets were measured.

The thermal stability is expressed by the rate (%) of weight loss by heating per one minute when the pellets were heated in air at 230° C. for 45 min.

The electrical conductivity is indicated by the volume resistivity calculated from the resistances at both ends of the test piece after being coated with an electrically conductive paint and dried.

What is claimed is:

1. A thermally stable, electrically conductive polyacetal resin composition, comprising a polyoxymethylene or a polyacetal copolymer having consecutive oxymethylene units in its main chain, 3-30 weight % based on the total resin composition of electrically conductive carbon black, and 0.1-15 weight % based on the total resin composition of an amide compound represented by the general formula:

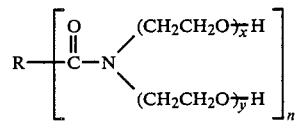

wherein R represents a carboxylic acid residue selected from saturated and unsaturated hydrocarbon groups having 2-23 carbon atoms or a basic unit of a vinyl polymer or a vinyl copolymer, x and y are each 0 or an integer of 1-10 and n is an integer of 1-6.

2. The composition of claim 1 wherein the electrically conductive carbon black is present in an amount of 3-10 weight % based on the total resin composition.

3. The composition of claim 1 wherein the amide compound is present in an amount of from 0.3 5 weight % based on the resin composition.

4. The composition of claim 1 wherein R is a carboxylic acid residue selected from saturated and unsaturated hydrocarbon groups.

5. The composition of claim 1 wherein $x+y=2-7$.

6. The composition of claim 1 wherein R is a basic unit of vinyl polymer or a vinyl copolymer.

7. The composition of claim 1 including 0.3-3 weight % based on the total resin composition of a low molecular weight polyolefin wax.

8. The composition of claim 7 including an antioxidant and an antiacid agent.

9. The composition of claim 7 wherein the low molecular weight polyolefin wax is a polyethylene wax prepared by thermal decomposition of high molecular weight polyethylene resin.

10. The composition of claim 1 including an amine compound as an antioxidant.

11. The composition of claim 1 wherein the amide compound is selected from the group consisting of fatty acid amides, higher fatty acid amides, ethylene oxide adducts of lower or higher fatty acid amides, vinyl polymer amides, vinyl copolymer amides and ethylene oxide adducts of vinyl polymer or copolymer amides.

12. The composition of claim 10 wherein the amide compound is selected from the group consisting of butyric amide, caproic amide, caprylic amide, capric amide, lauric amide, myristic amide, palmitic amide, stearic amide, behenic amide, oleic amide, linoleic amide, linolenic amide, erucic amide, natural higher fatty acid amides, succinic diamide, adipic diamide, sebacic diamide, dodecanedicarboxylic diamide, propane-1,2,3-tricarboxylic triamide, benzoic amide, ortho-phthalic diamide, terephthalic diamide, trimellitic triamide, pyromellitic tetraamide, polyacrylic amide, polymethacrylic amide, a copolymer of ethylene and acrylic amide, and ethylene oxide adducts thereof.

* * * * *